United States Patent [19]

Okinoshima

[11] Patent Number: 4,591,608
[45] Date of Patent: May 27, 1986

[54] ULTRAVIOLET-CURABLE ORGANOPOLYSILOXANE COMPOSITION

[75] Inventor: Hiroshige Okinoshima, Gunma, Japan

[73] Assignee: Shin-Etsu Chemical Co., Ltd., Tokyo, Japan

[21] Appl. No.: 671,697

[22] Filed: Nov. 15, 1984

[30] Foreign Application Priority Data

Nov. 25, 1983 [JP] Japan ................. 58-221843

[51] Int. Cl.$^4$ .................. C08F 2/50; C08F 30/08
[52] U.S. Cl. ................................ 522/13; 522/99
[58] Field of Search ............................ 204/159.13

[56] References Cited

U.S. PATENT DOCUMENTS 4,306,042 12/1981 Neefe ..................... 204/159.13
4,364,809 12/1982 Sato et al. ............... 204/159.13

*Primary Examiner*—Jacob Ziegler
*Attorney, Agent, or Firm*—Toren, McGeady, Stanger, Goldberg & Kiel

[57] ABSTRACT

The organopolysiloxane composition provided by the invention is very efficiently curable into a rubbery elastomer by the irradiation with ultraviolet light in the wave length region of even 300 nm or longer. The composition comprises (a) 100 parts by weight of a linear diorganopolysiloxane terminated at both molecular chain ends each with a di- or trivinylsilyl group, (b) 0.1 to 10 parts by weight of an organic peroxide and (c) 0.1 to 5 parts by weight of an aromatic ketone compound, e.g. benzophenone, which serves as a photosensitizer for the ultraviolet-induced curing.

7 Claims, No Drawings

ULTRAVIOLET-CURABLE ORGANOPOLYSILOXANE COMPOSITION

BACKGROUND OF THE INVENTION

The present invention relates to a novel ultraviolet-curable oganopolysiloxane composition or, more particularly, to an organopolysiloxane composition curable by irradiation of ultraviolet light at a remarkably high curing velocity with high sensitivity to ultraviolet irradiation.

Ultraviolet-curable organopolysiloxane compositions are known and those comprising a first organopolysiloxane having vinyl groups bonded to the silicone atoms and a second organopolysiloxane having mercapto-substituted hydrocarbon groups bonded to the silicon atoms are disclosed, for example, in Japanese Patent Publications Nos. 54-6512 and 57-34318. The compositions of this type are not quite satisfactory due to the poor storage stability and the surface tackiness of the cured article thereof as well as limited mechanical strengths as a rubbery elastomer so that the rubbery film formed thereof by ultraviolet irradiation is practically disadvantageous. An improved ultraviolet-curable organopolysiloxane composition is disclosed in Japanese Patent Kokai 55-125123 which is a vinyl-containing organopolysiloxane admixed with an organic peroxide. By virtue of the curing accelerating effect of the organic peroxide, such a composition is somewhat advantageous when the rubber article to be cured has a relatively large thickness as a result of the accelerated curing even in the depth of the thick layer. The disadvantages in the compositions of this type are the relatively low curing velocity and the requirement for the wave length of the ultraviolet light which should be in the range from 100 to 300 nm in order to be effective for the curing of the composition. Needless to say, the availability of an ultraviolet light source emitting in such a wave length region is relatively low in comparison with the ultraviolet lamps emitting in the region from 300 nm to visible so that the practical applicability of such a composition is greatly limited.

SUMMARY OF THE INVENTION

It is therefore an object of the present invention to provide a novel and improved ultraviolet-curable organopolysiloxane composition free from the above described disadvantages and problems in the prior art organopolysiloxane compositions curable by ultraviolet irradiation.

The ultraviolet-curable organopolysiloxane composition of the invention provided as a result of the extensive investigations of the inventors comprises:

(a) 100 parts by weight of an organopolysiloxane having a substantially linear molecular chain structure and containing ethylenically unsaturated monovalent hydrocarbon groups at least at both molecular chain ends as represented by the general formula

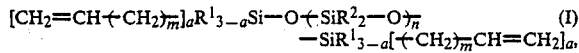

in which $R^1$ is a substituted or unsubstituted monovalent hydrocarbon group having no aliphatic unsaturation, $R^2$ is a substituted or unsubstituted monovalent hydrocarbon group, the suffix m is zero or a positive integer not exceeding 4, a is 1, 2 or 3 and n is zero or a positive integer not exceeding 10,000;

(b) from 0.1 to 10 parts by weight of an organic peroxide; and (c) from 0.1 to 5 parts by weight of an aromatic ketone compound as a photosensitizer.

DETAILED DESCRIPTION OF THE PREFERRED EMBODIMENTS

The above described inventive ultraviolet-curable organopolysiloxane is formulated on the base of the newly discovered principle that a composition of an organopolysiloxane having terminal vinyl groups is imparted with a remarkably increased sensitivity for the ultraviolet-induced crosslinking when it is admixed with an organic peroxide and an aromatic ketone compound as a photosensitizer in combination in comparison with conventional compositions so that the composition can be cured efficiently even by the irradiation with ultraviolet light of the wave length larger than 300 nm without being affected by the oxygen in the atmospheric air. Further, the cured product of the composition is excellent in the heat resistance and electric properties as well as rubbery elasticity inherent to silicone rubbers. In addition, there is no problem of precipitation of a solid material in the cured composition which is unavoidable in the conventional similar ultraviolet-curable compositions. The curability of the inventive ultraviolet-curable composition with the ultraviolet light of the wave length of 300 nm or larger gives an additional advantage that the composition can be cured even by the ultraviolet light transmitting a layer of a transparent glass or plastic covering thereon so that the composition can be utilizable as an adhesive in a variety of parts in optical instruments such as lenses and prisms.

The base component comprised in the inventive ultraviolet-curable composition is an organopolysiloxane represented by the general formula (I) given above. In the formula, $R^1$ is a monovalent hydrocarbon group having no aliphatic unsaturation exemplified by alkyl groups such as methyl, ethyl, propyl and butyl groups, cycloalkyl groups such as cyclopentyl and cyclohexyl groups, aryl groups such as phenyl and tolyl groups and aralkyl groups such as benzyl and phenylethyl groups as well as those substituted monovalent hydrocarbon groups obtained by the replacement of a part or all of the hydrogen atoms in the above named hydrocarbon groups with halogen atoms or other substituent atoms or groups such as 3,3,3-trifluoropropyl, 3-chloropropyl, chloromethyl, chlorophenyl and dibromophenyl groups. The groups denoted by $R^1$ in a molecule may not be the same ones but can be different from each other.

The group denoted by $R^2$ is a substiututed or unsubstituted monovalent hydrocarbon group including, in addition to the above named unsubstituted or substituted monovalent hydrocarbon groups given as the examples of the group $R^1$, aliphatically unsaturated monovalent hydrocarbon groups exemplified by alkenyl groups such as vinyl and allyl groups. It is also optional that the groups denoted by $R^2$ in a molecule include the groups of different kinds although it is preferable that the molar proportion of the aliphatically unsaturated groups in the overall groups denoted by $R^2$ in a molecule or, rather, in the component (a) as a whole should not exceed 5% when decrease in the rubbery elasticity and brittleness in the cured composition should be avoided.

The suffix m in the general formula (I) is zero or a positive integer not exceeding 4 and it is preferable that the value of m is zero or 1 or, more preferably, zero. Further, the suffix a in the general formula (I) is 1, 2 or 3 or, preferably, 2 or 3. This means that the organopolysiloxane molecule should have at least one or, preferably, two or three ethylenically unsaturated groups or, preferably, vinyl groups at each of the molecular chain ends. The suffix n is zero or a positive integer not exceeding 10,000. When n is zero, the organopolysiloxane is a disiloxane. It is, however, preferable that the value of n is at least 50 in order that the cured product of the composition may have good rubbery elasticity. Although the value of n has no particular upper limit, the above mentioned upper limit of 10,000 is given in consideration of the requirement that the composition before curing should have good flowability to facilitate coating works.

It should be noted that, since the above given limitation in the value of n is mainly determined in view of the viscosity behavior of the resultant composition, the component (a) may be a mixture of two different organopolysiloxanes each having a viscosity quite different from that of the other provided that the mixture as a whole has a viscosity in the above specified range. For example, even a diorganopolysiloxane having an extremely large value of n to give a gum-like consistency can be used when it is combined and diluted with another diorganopolysiloxane of a sufficiently low viscosity provided that the mixture has a viscosity to ensure flowability. In this regard, accordingly, even a hexaorganodisiloxane, e.g. hexamethyldisioxane, can be used as such a diluent siloxane for a gummy diorganopolysiloxane. In short, the limitation in the suffix n should be construed to refer to an average value.

It should also be noted that, when the cured product of the inventive composition is desired to have improved mechanical strengths or, in particular, tensile strength and tear strength, the component (a) should better be a mixture of two types of the organopolysiloxanes of the general formula (I), of which one has a relatively large content of the aliphatically unsaturated groups, e.g. vinyl groups, and the other has a low content of the vinyl groups to satisfy the above mentioned preferable condition that the molar proportion of such unsaturated groups to the overall groups $R^2$ in the component (a) should not exceed 5%. For example, such a high-vinyl organopolysiloxane can be a cyclic one expressed by the formula

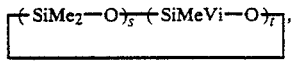

in which Me is a methyl group, Vi is a vinyl group, s is zero or a positive integer and t is a positive integer with the proviso that s+t is in the range from 3 to 8 or, typically, 4, and such a vinyl-containing cyclic polysiloxane is mixed with a long-chain diorganopolysiloxane of the general formula (I) having no vinyl groups as the groups denoted by $R^2$. In other words, such a cyclic polysiloxane can be used for partial substitution of the chain units $-SiR^2{}_2-O-$ in the general formula (I) for the component (a).

It is also optional that the inventive composition may contain a small amount of one or more other organopolysiloxanes not in conformity with the general formula (I) in addition to the component (a) when a particular improvement is desired in the inventive composition either before or after curing. For example, improvements in the mechanical properties of the cured composition can be obtained by the admixture of a resinous organopolysiloxane composed of the tetrafunctional siloxane units $SiO_2$, monofunctional siloxane units $R^2{}_3SiO_{0.5}$ and difunctional siloxane units $R^2{}_2SiO$. Further, the elastic modulus of the cured composition can be decreased by the admixture of a diorganopolysiloxane having no functional or reactive groups.

The second essential component in the inventive ultraviolet-curable organopolysiloxane composition is the component (b) which is an organic peroxide compound acting as a curing accelerator of the component (a) under ultraviolet irradiation. Several types of organic peroxide compounds are suitable for the purpose including peroxyketal-type peroxides such as 1,1-bis(tert-butylperoxy)-3,3,5-trimethyl cyclohexane and 2,2-bis(tert-butylperoxy) butane, diacyl-type peroxides such as diisobutyryl peroxide, octanoyl peroxide and benzoyl peroxide, dialkyl peroxides such as di-tert-butyl peroxide, tert-butyl cumyl peroxide, di-cumyl peroxide and $\alpha,\alpha'$-bis(tert-butyl peroxy) p-diiso-propylbenzene, perester-type peroxides such as tert-butyl peroxybenzoate and tert-butyl peroxy isopropylcarbonate and others. These peroxide compounds can be used either singly or as a combination of two kinds or more according to need.

The third essential component in the inventive ultraviolet-curable organopolysiloxane composition is the component (c) which is an aromatic ketone compound having an activity as a photosensitizer. Such a compound is exemplified by acetophenone, propiophenone, benzophenone, 4,4'-bis(dimethylamino) benzophenone, benzaldehyde, 3- and 4-methylacetophenones, 3- and 4-pentylacetophenones, 3- and 4-methoxybenzophenones, 3-and 4-methylbenzophenones, 3- and 4-chlorobenzophenones, 4,4'-dimethoxybenzophenone, 4-chloro-4'-benzyl benzophenone and the like. These aromatic ketone compounds can be used either singly or as a combination of two kinds or more according to need.

The ultraviolet-curable organopolysiloxane composition of the invention can be prepared by uniformly blending the above described components (a), (b) and (c). The blending amounts of the components (b) and (c) are determined on the base of the component (a) and should be in the ranges from 0.1 to 10 parts by weight or, preferably, from 0.5 to 5.0 parts by weight and from 0.1 to 5.0 parts by weight or, preferably, from 0.1 to 2.0 parts by weight of the components (b) and (c), respectively, per 100 parts by weight of the component (a). Addition of an excessively large amount of the component (c), i.e. photosensitizer, is undesirable in order to avoid possible loss of the balance in the curability of the composition between the surface layer and the depth of a relatively thick layer, the curing velocity being much larger in the surface layer than in the depth.

It is optional that the inventive organopolysiloxane composition is further admixed with a variety of additives conventionally used in the ultraviolet-curable organopolysiloxane compositions including inorganic fillers such as fumed silica, coloring agents such as pigments and dyes, flame retardants, heat resistance improvers, silane coupling agents as an adhesion improver and the like. Although the inventive composition is uses usually without dilution with an organic solvent, it is optional to add an organic solvent when a very thin film of the cured composition is desired. Suitable organic solvents include n-hexane, toluene, xylene and the like.

The ultraviolet-curable organopolysiloxane composition of the invention prepared in the above described manner can be cured with high sensitivity by the irradiation with ultraviolet light in the wave length region of 300 nm or longer. Suitable ultraviolet lamps capable of emitting in such a wave length region include low-pressure mercury lamps, high-pressure mercury lamps, ultrahigh-pressure mercury lamps, xenon lamps, xenon-mercury lamps, metal halide lamps and the like without particular limitations although high-pressure mercury lamps are preferred in view of the availability and high efficiency. The ultraviolet lamp may be of an ozone-generating type or ozoneless type but the lamps of the former type are preferred because the ultraviolet light emitted from such a lamp is accompanied by the ultraviolet light in the higher energy region to contribute to the acceleration of the curing of the composition.

As is understood from the above description, the most characteristic feature of the inventive composition is the addition of the component (c), i.e. the aromatic ketone compound as a photosensitizer, which has an unexpected effect of greatly accelerating the curing of the composition composed of the components (a) and (b) by the ultraviolet light of longer wave lengths. As a result, the inventive composition can be cured within a relatively short time of ultraviolet irradiation to give a cured elastomer of a silicone rubber with very uniform cured state from the surface to the core portion having excellent mechanical properties as well as heat resistance and electric properties without the problem of solid precipitates. The applicability of the inventive composition is greatly expanded so much by virtue of the curability of the composition by the irradiation with the longer wave length ultraviolet light including protective coating of various kinds of electric and electronic devices and instruments, adhesive use in lenses and prisms in optical instruments as well as transparent plastic-made articles, soldering resist, masking material in the through-hole of printed circuit boards, coating material on optical fibers, sealing and packing materials and others.

Following are the examples to illustrate the invention in more detail. In the following description, the expression of "parts" refers to "parts by weight" in each occurrence and the values of the viscosity are all those obtained by the measurements at 25° C.

EXAMPLE 1

An organopolysiloxane composition I was prepared by uniformly blending 100 parts of a dimethylpolysiloxane having a viscosity of 3000 centistokes and terminated at both molecular chain ends each with a trivinylsilyl group, 1 part of tert-butyl peroxybenzoate and 1 part of benzophenone. For comparison, two similar dimethylpolysiloxane compositions were prepared by omitting benzophenone (composition II) or by omitting tert-butyl peroxybenzoate (composition III) from the above given formulation for the composition I.

Each of these three compositions was spread in a 0.5 mm thick layer and irradiated for 5 seconds with ultraviolet light emitted from an ozone-generating type high-pressure mercury lamp of 80 watts/cm output held 10 cm above the layer. It was found that the composition I was completely cured into a rubbery elastomer while the composition II was cured only in the surface layer leaving the composition uncured beneath the surface and the composition III was still in a gel-like consistency.

Further, each of the compositions was sandwiched with two soda glass plates of 1 mm thickness to form a 0.5 mm thick layer therebetween and irradiated for 5 seconds with the ultraviolet light in the same manner as above but through the glass plate. It was found that the curing of the composition I was as complete as in the direct irradiation mentioned above while the composition II was still in an oily state without noticeable changes and the composition III had a somewhat increased viscosity approaching a gel-like condition.

EXAMPLE 2

An organopolysiloxane composition IV was prepared by uniformly blending 100 parts of the same dimethylpolysiloxane as used in Example 1, 1 part of di-tert-butyl peroxide and 1 part of benzophenone and the ultraviolet irradiation of the composition was performed in the same manner as in Example 1 excepting the extension of the irradiation time to 10 seconds. It was found that curing of the composition was complete to give a rubbery elastomer irrepective of the presence or absence of the soda glass plate between the ultraviolet lamp and the layer of the composition under irradiation.

For comparison, organopolysiloxane compositions V and VI were prepared by blending 100 parts of the same dimethylpolysiloxane with 2 parts of di-tert-butyl peroxide or with 2 parts of benzophenone, respectively, and the curability thereof by ultraviolet irradiation was tested in the same manner as above. In the direct irradiation, the composition V was cured only inside leaving the surface layer uncured and the composition VI was converted only into a gel-like mass. In the ultraviolet irradiation through a soda glass plate, the composition V was left uncured and the composition VI was only partially gelled to give a mixture of the gel and the silicone fluid.

EXAMPLE 3

An organopolysiloxane composition was prepared by uniformly blending 100 parts of a dimethylpolysiloxane having a viscosity of 7000 centistokes and terminated at both molecular chain ends each with a trivinylsilyl group, 10 parts of a fumed silica filler surface-blocked with trimethylsilyl groups, 2 parts of tert-butyl cumyl peroxide, 2 parts of di-tert-butyl peroxide and 1 part of benzophenone and the composition was shaped into a sheet-like form of 2 mm thickness.

The sheet was irradiated with the ultraviolet light for 6 seconds under the same conditions as in Example 1 and found to be completely cured into a rubber sheet of which the properties were: hardness (JIS) 23; ultimate elongation at break 150%; tensile strength 8 kg/cm$^2$; volume resistivity $1.2 \times 10^{15}$ ohm-cm; breakdown voltage 26 kV/mm; dielectric constant at 50 Hz 2.91; and dielectric tangent at 50 Hz $4.4 \times 10^{-4}$. The above described properties were retained with little changes even after heating of the sheet at 200° C. for 72 hours.

EXAMPLE 4

An organopolysiloxane composition was prepared with the same formulation as that for the composition in Example 3 excepting the further addition of 1 part of vinyl trimethoxysilane. The composition was shaped into a sheet and irradiated with ultraviolet light in the same manner as in Example 3 to be completely cured into a rubber sheet which had about the same mechanical and electric properties as the rubber sheet obtained in Example 3. In addition, the composition exhibited good adhesion to the substrate surface when it was cured on a substrate of aluminum, nickel, silicon, ceramic, glass or polyester.

What is claimed is:

1. An organopolysiloxane composition curable by irradiation with ultraviolet light which comprises:
   (a) 100 parts by weight of an organopolysiloxane having a substantially linear molecular chain structure and containing ethylenically unsaturated monovalent hydrocarbon groups at least at both molecular chain ends as represented by the general formula

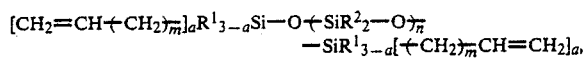

in which $R^1$ is a substituted or unsubstituted monovalent hydrocarbon group having no aliphatic unsaturation, $R^2$ is a substituted or unsubstituted monovalent hydrocarbon group, the suffix m is zero or a positive integer not exceeding 4, a is 1, 2 or 3 and n is zero or a positive integer not exceeding 10,000;
   (b) from 0.1 to 10 parts by weight of an organic peroxide; and
   (c) from 0.1 to 5 parts by weight of an aromatic ketone compound as a photosensitizer.

2. The organopolysiloxane composition as claimed in claim 1 wherein the suffix m is zero.

3. The organopolysiloxane composition as claimed in claim 1 wherein the suffix a is 2 or 3.

4. The organopolysiloxane composition as claimed in claim 1 wherein the suffix n is in the range from 50 to 1000.

5. The organopolysiloxane composition as claimed in claim 1 wherein the aromatic ketone compound as the component (c) is selected from the class consisting of acetophenone, propiophenone, benzophenone, 4,4'-bis(dimethylamino) benzophenone, benzaldehyde, 3- and 4-methylacetophenones, 3- and 4-pentylacetophenones, 3- and 4-methoxybenzophenones, 3- and 4-methylbenzophenones, 3- and 4-chlorobenzophenones, 4,4'-dimethoxybenzophenone and 4-chloro-4'-benzyl benzophenone.

6. The organopolysiloxane composition as claimed in claim 5 wherein the aromatic ketone compound as the component (c) is benzophenone.

7. The organopolysiloxane composition as claimed in claim 1 wherein the monovalent hydrocarbon group denoted by $R^2$ is a methyl group.

* * * * *